United States Patent [19]

Koziatek et al.

[11] 3,992,056

[45] Nov. 16, 1976

[54] CAR SEAT

[75] Inventors: Jerome P. Koziatek, Hinckley, Ohio; Leo F. Wildgen, Minneapolis, Minn.

[73] Assignee: Questor Corporation, Toledo, Ohio

[22] Filed: July 14, 1975

[21] Appl. No.: 595,700

[52] U.S. Cl. .............................. 297/250; 297/454; 297/457
[51] Int. Cl.² .......................................... A47C 1/08
[58] Field of Search ............ 297/256, 254, 457, 454

[56] References Cited
UNITED STATES PATENTS

| | | | |
|---|---|---|---|
| 3,206,247 | 9/1965 | Johnson | 297/254 |
| 3,335,434 | 8/1967 | Gamon | 297/250 UX |
| 3,596,986 | 8/1971 | Bagsdale | 297/457 X |
| 3,709,558 | 1/1973 | Jakob | 297/250 |
| 3,794,379 | 2/1974 | Furey | 297/250 |

Primary Examiner—James C. Mitchell
Attorney, Agent, or Firm—Donald R. Bahr; John E. Benoit

[57] ABSTRACT

A car seat for use in an automobile having a lap belt; said seat comprising an integral double wall molded shell; said shell having a seat section, a back rest section, and side panel sections extending substantially the length of the seat section and the back section. Slots are provided through the back rest section substantially adjacent to the associated side panel sections and above the seat section, with the slots being of a dimension to accept the automobile lap belt which is passed therethrough. A restraint harness means is provided in order to secure the occupant to said seat after the seat is secured into the automobile by means of the lap belt.

9 Claims, 9 Drawing Figures

CAR SEAT

This application relates generally to car seats and more specifically to child car seats which are comprised of an integral double-walled molded shell.

Revised federal safety regulations have eliminated the use of the older type of car seats which have been available over the past years. In order to meet these new rigid requirements, many new types of car seats have been developed and tested to determine the quality thereof. These seats generally fall into two categories; one being a tubular steel structure with a padded seat and back, and the second being a molded integral type of structure which generally provides a shell in which the youngster is placed.

The molded car seats which are in use today are comprised of a single wall structure and are generally made of one of the well-known plastic materials. In this type of seat, a back strap is often required in order to meet the various safety regulations. This back strap comprises a strap which passes through the upper part of the back of the molded seat and passes over the front of the automobile seat and is secured to the back auto seat belt or is secured to a connecting device mounted in the rear deck beyond the back seat. Further, these types of seats generally require that the adult auto lap belt pass over the child, therefore encompassing both the child and the auto seat. One of the problems which occur when the adult auto lap belt passes over the child is that upon impact, this system allows the entire seat and child to pivot forward in the event of a frontal impact.

A further objection to the molded seats now available is that they must use a relatively rigid material such as polypropylene and the like in order to feasibly provide a seat having a single wall construction which will meet the requirements of the regulations. Unfortunately, if this type of material should fracture it may present a very sharp fracture plane which increases the probability of secondary injuries.

It is also noted that most of the available molded seats may be used only in a position in which the child faces forward. In some cases, particularly where small infants are involved, it is preferable to mount the car seat in a position with the child facing rearward. Often times this is a much safer condition and may be used for infants which do not customarily require that they be able to view the outside of the car.

Accordingly, it is an object of this invention to provide a car seat which comprises an integral double-walled molded shell.

A further object of this invention is to provide a car seat which is restrained by the auto seat belt without the belt passing around the occupant of the car seat.

Another object of this invention is to provide a car seat which meets safety regulations without the use of a back strap.

Yet another object of this invention is to provide a car seat which may be retained in position by the auto seat belt in either the front or rear facing position.

An additional object of this invention is to provide a car seat having means for supporting the seat in either an upright or reclining position.

These and other objects of the invention will become apparent from the following description when taken in conjunction with the drawings wherein.

Figure 9:
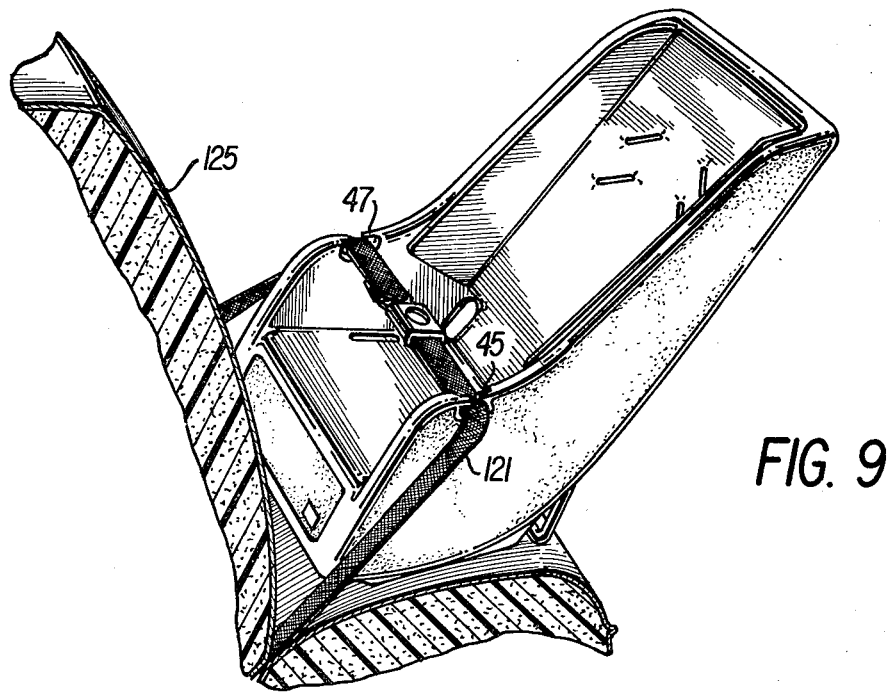

and FIG. 9 shows the seat in an automobile in the rearward facing position.

Broadly speaking, the present invention provides a car seat for use in an automobile having a lap belt, said seat comprising an integral double wall molded shell; said shell having a seat section, a back rest section, and side panel sections extending substantially the length of the seat section and the back section. Slots are provided through the back rest section substantially adjacent to the associated side panel sections and above the seat section, with the slots being of a dimension to accept the automobile adult passenger restraining system including a lap belt and/or connected shoulder belt which is passed therethrough. A restraint harness means is provided in order to secure the occupant to said seat after the seat is secured into the automobile by means of the lap belt.

Figure 1:
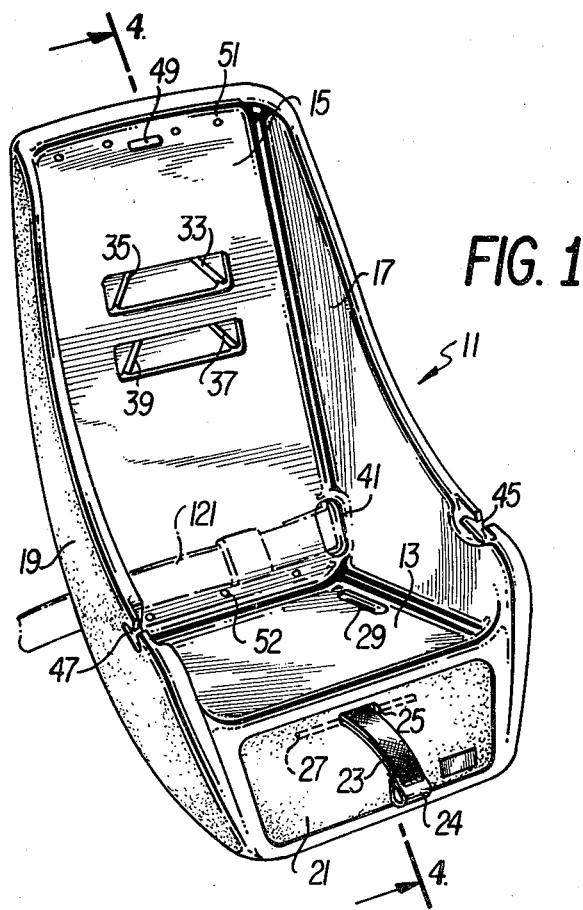
FIG. 1 is a perspective view of the basic shell structure of the car seat of the present invention.

Turning now more specifically to the drawings there is shown in FIG. 1 a perspective view of an integral child's car seat 11 having a seat 13, a back 15 and side panels 17 and 19. Extending outwardly from below the seat is a crotch strap 23 terminating in a buckle 24. The strap is held to a fixed length by means of a rod 27 within the lower section of the seat with the crotch strap 23 passing outwardly of the slot 25. The reason for the crotch strap being of a predetermined fixed length will become apparent as the description proceeds.

There is also provided a pair of seat slots 29 and 31 which pass through the seat adjacent the panels on either side of the seat. Additionally, there are provided in the upper portion of the back two pairs of slots 33, 35 and 37, 39. The particular use of these slots will become apparent as the description proceeds, but, as will be obvious, the two sets of slots are provided so that the harness may be adjusted in accordance with the size of the child placed in the car seat.

A further set of slots 41 and 43 are provided in the lower portion of the back above the seat section. Slots 41 and 43 are specifically designed in order to accept the auto lap belt which is shown in dotted lines 121. It is to be specifically noted that the lap belt is designed to secure the seat to the auto seat and does not pass around the child occupant.

The seat is further provided with slots 45 and 47 having reduced entrant openings 46 and 48 which are in the edge of the lower panel sections 17 and 19. These slots also accept the auto lap belt and are used when the seat is placed in a rearward facing position as will be discussed subsequently.

There may further be provided an additional slot 49 which may be used to grasp the top of the seat in order to transport it from one vehicle to another or to remove and store the seat when not in use.

Figure 2:
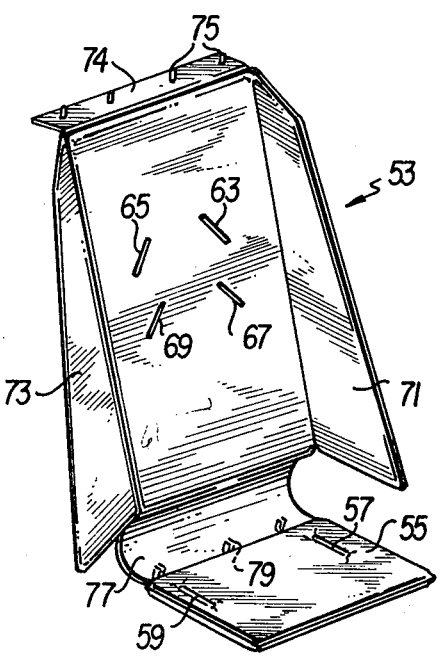
FIG. 2 is a perspective view of the padded insert which fits into the seat of FIG. 1.

A series of holes 51 are provided at the upper part of the back of the seat and a series of holes 52 are provided at the lower part of the back of the seat. These holes are used to secure the cushion 53 illustrated in FIG. 2 to the car seat itself.

As may be seen, the cushion 53 includes a padded seat portion 55 having slots 57 and 59 which match the slots 29 and 31 in the seat of the car seat itself. Likewise, the back of the cushion has a padded section which has a plurality of slots 63, 65, 67 and 69 which match with the slots in the back of the car seat 33, 35, 37 and 39. The cushion has two side flaps 71 and 73 in order to protect the occupant and keep him separated from the molded plastic side panel 17 and 19 of the car seat. The upper part of the cushion terminates in a flap 74 having pegs 75 which mate with and are insertable into the holes 51 in the upper part of the car seat. The back cushion 61 and the seat cushion 55 are connected by a flexible section 77 which includes pegs 79 which mate with the holes 52 in the lower part of the back section 15 of the car seat. The flexible section 77 is of sufficient width so that the lower back slots 41 and 43 are clear and, therefore, able to accept the auto lap belt as shown.

Figure 3:
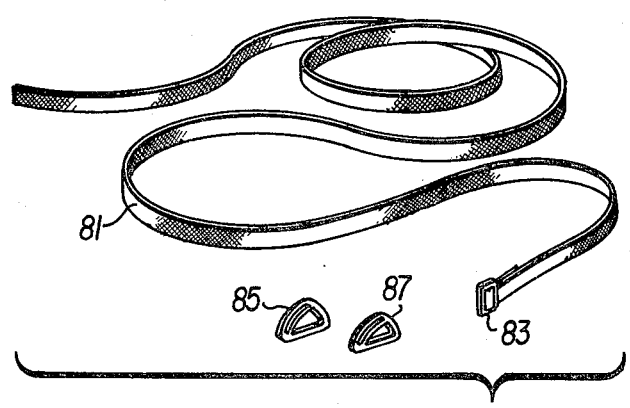
FIG. 3 illustrates the safety harness and associated buckles used with the seat illustrated in FIG. 1.

FIG. 3 illustrates a single flexible belt 81 terminating in a buckle clasp 83, and the two triangular clasps which are used with the belt. As can be seen from the other drawings, this belt is threaded properly through the desired slots in the upper back section of the seat and through the slots in the seat section itself so as to provide, in effect, shoulder straps and lap belts for the occupant. The threading sequence may be more clearly understood from FIGS. 5 and 8. The triangular clasps 85 and 87 are used in the standard manner to secure these formed shoulder and lap straps to the buckle 24 of the crotch strap 23. The threading of the flexible strap 81 and its ultimate position is more clearly seen in FIGS. 5, 6 and 8. In this connection it will now be apparent why the crotch strap 23 is of a fixed length. One of the safety requirements is that the lap belt section or sections must pass over the thighs of the individual in the seat. Therefore, by having a permanently fixed length for the crotch strap, which cannot be varied by the owner, the lap straps must always pass over the thighs of the individual as required at an angle forward at the occupant's hip joint as required.

Figure 4:
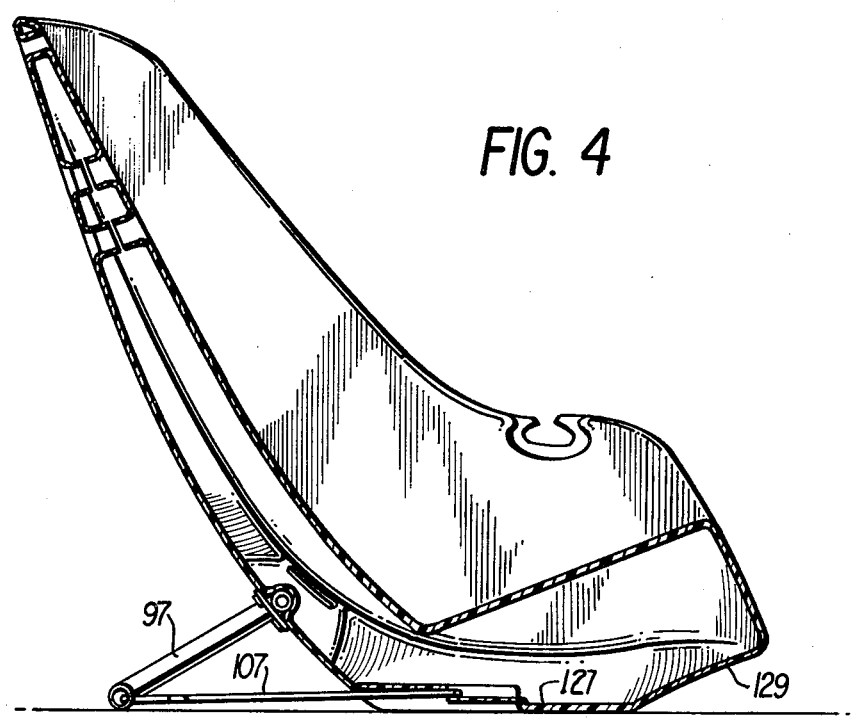
FIG. 4 is a sectional view taken along the lines 4—4 of FIG. 1.

FIG. 4 is a cross sectional view taken through the lines 4—4 of FIG. 1. This cross sectional view illustrates the double wall construction of the chair of the car seat itself. This substantially closed double wall construction is essential in the present car seat in that it allows the use of the auto lap belt and the separate child restraining harness to provide sufficient restraint for meeting the requirement of safety standards without the additional need of a back strap retaining the upper part of the seat back by means of a clasp attached to the car structure. In order to use the seat as shown without a back strap, it is necessary that the back rest of the seating system be very rigid and yet permit some deflection to allow the seating system to absorb and cushion the shock at impact. The use of the proper double wall construction with material such as polyethylene provides a plastic shell which will deflect to a certain amount to allow impact absorption through the harness and plastic shell. Using a single walled construction, the seat would be too rigid and there would be less cushioning from shell deflection and the impact would be absorbed largely be stretching of the child harness system itself. It should be further noted that the double-wall of the present invention permits attachment of a child harness, adult lap belt, and a tubular support system without any additionl attachment hardware requirements. This permits more uniform outside contours both on the surfaces away from the child as well as surfaces within the child's seating area thus precluding likelihood of injuries incurred by occupant impact of abrupt contour changes of the seating system itself.

Another important part of this entire seating system is the location of the back slots 41 and 43 which accept the auto lap belt. With the location being between the shoulder slots and the lap belt slots of the harness system, a dynamic impact results in forces being generally equalized between the shoulder and the lap belts of the harness. This provides less forward and lateral tipping of the car seat, less submarining of the child's body and a minimum of head excursion. Further, less force is applied directly to the seat back and side walls, thus allowing the double wall construction of the seat to absorb the impact energy by deflection, similar to a cantilever beam without collapsing. The position of slots 41 and 43 is also important relative to the support structure as will be discussed as the description proceeds.

Figure 5:
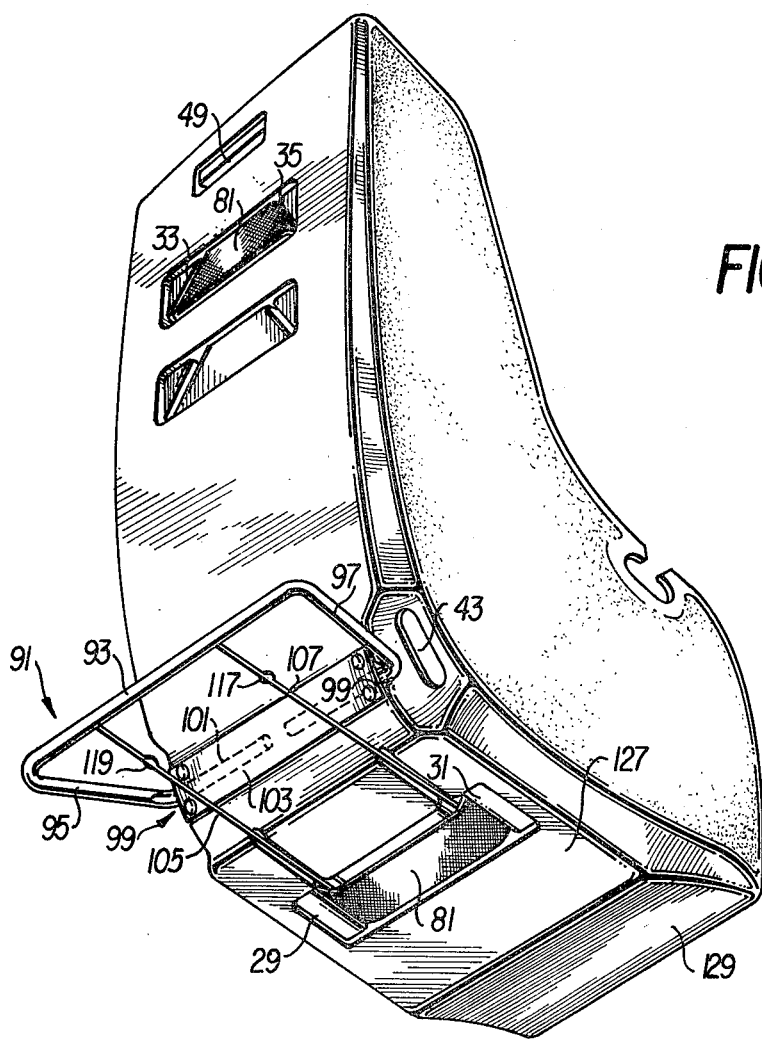
FIG. 5 is a perspective view of the rear and underside of the seat of FIG. 1.
Figure 6:
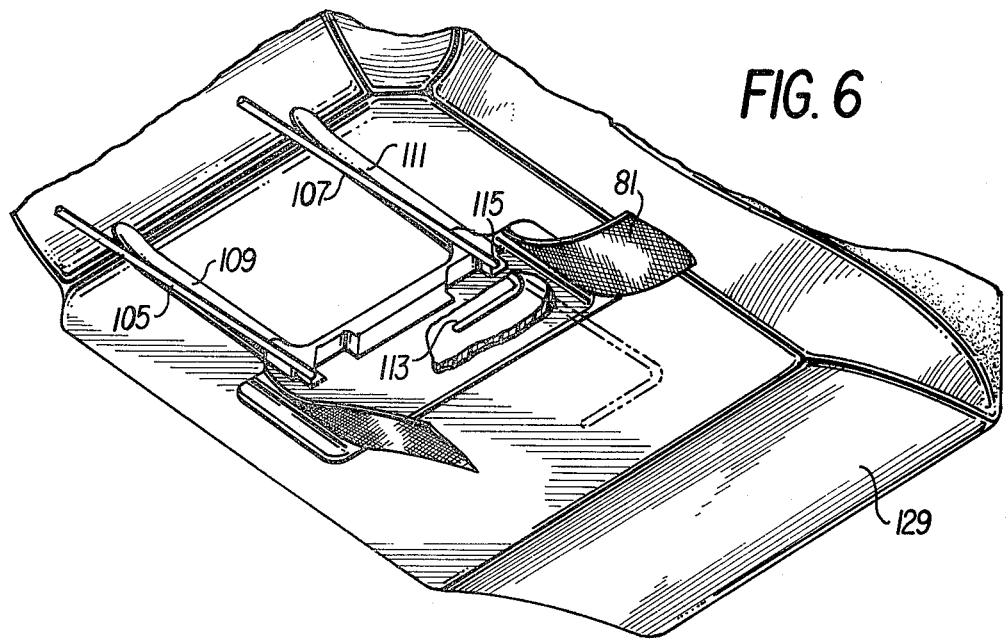
FIG. 6 is a partial view of the underside of the car seat detailing the support structure used therewith.

Turning now to FIGS. 5 and 6 there are shown perspective views illustrating the tubular steel support system used in conjunction with the car seat described above. A generally C-shaped steel tube 91 has a bite 93 with extending legs 95 and 97 terminating in feet 99 extending inwardly into a preformed channel 101 in the rear surface of the seat. The feet 99 of tube 91 are held in a rotatable position by means of plate 103 which is secured to the rear surface of the seat by rivets or any other well-known means.

Figure 7:
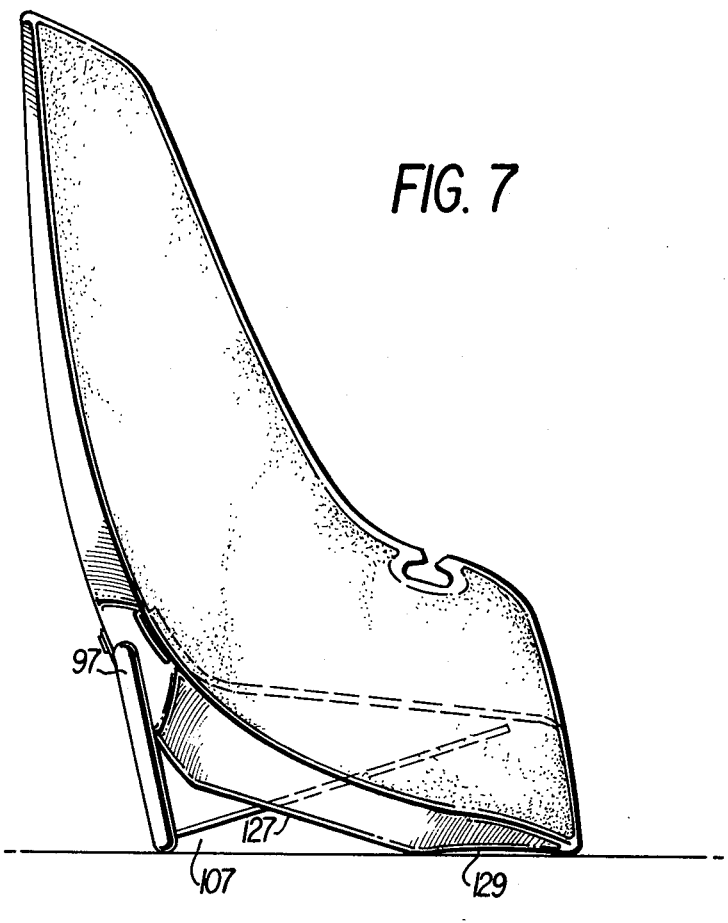
FIG. 7 is a side elevational view showing the two position adjustment for the seat of FIG. 1.

Legs 107 and 108 are inserted at one end thereof within the bite 93 of the tube 91 in such a manner that they are held therein but are moveable to a certain degree in any direction. These bars extend along the underside of the seat in channels 109 and 111 and also terminate in feet 113 which extend beyond ledges 115 and into the interior of the lower section of the seat itself. This arrangement permits the legs 105 and 107 to slide along channels 109 and 111 so as to change the position of the tube 91 and, thus, the supporting position of the seat itself. As can be seen the proper reclining position will be positively set by means of the feet 113 which will abut against the inside of ledges 115 of the seat and therefore will hold the tube 91 in the position shown in FIG. 5. As the tube is rotated in a counter clockwise direction, the legs 107 and 108 pass into the inner section of the lower part of the seat and are limited in their travel by means of the feet 113 on the legs which are limited in their travel when the tube 91 is in an upright seat position by the inside surface of the seat shell as shown in dotted lines in FIG. 7. Flattened sections 117 and 119 are so located on legs 107 and 108 such that they just enter into car seat seating surface bottom beyond ledge 115 to restrict movement of legs 107 and 108 thus maintaining the position of tube 91 in location that provides an upright seating position of the car seat. When the seat support structure is in the position shown in FIG. 5 it is in the reclining position and the planar surface 127 will be substantially in contact with the automobile seat. When the tube 91 is rotated to its other position, the car seat will be in its upright position and the planar section 129 will be substantially in contact with the car seat. Therefore, the support provided by the two positions assumed by the tubular steel support system are directly related to the particular configuration of the underside of the seat section of the car seat.

Figure 8:
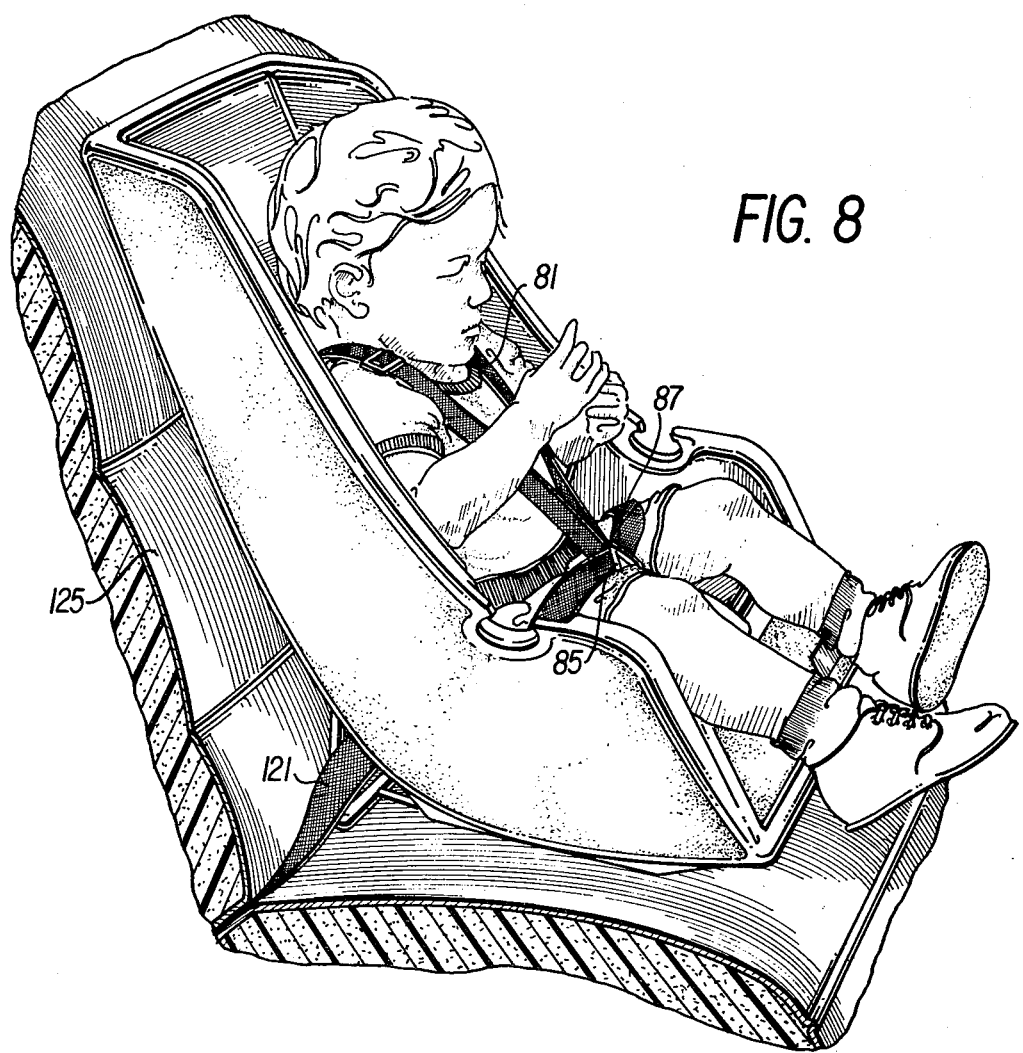
FIG. 8 shows the seat of FIG. 1 positioned in an automobile in a forward facing position.

The illustration in FIG. 8 shows the seat in its upright position being supported by the tubular structure and having the auto seat belt passing through the slots 41 and 43 behind the child and securely retaining the seat in firm position against the automobile seat. As mentioned previously FIG. 8 also illustrates the use of the strap and the triangular clasps and buckles for retaining the harness around the child. Note particularly the fact that the lap belts of the one piece harness system pass over the thighs of the occupant and at an angle substantially forward of the occupant's hip joint.

FIG. 9 shows the use of the seat in a rearward facing position which is most desirable for a small infant. The infant is not shown in the seat, nor is the integral harness system, but will be retained therein by the harness system shown in FIG. 8. As can be seen, the automobile lap belt 121 passes through the slots 45 and 47 in the side sections of the auto seat and the slots are so designed that the belt is retained therein when it is securely connected after the car seat is in place and positioned properly.

A further advantage of the structure, as shown particularly in FIG. 8, is that the car seat may be changed from the upright to the reclining position and vice versa without removing the automobile seat belt, therefore providing an extra convenience for the adult who wishes to change the car seat position. In other car seats the automobile seat belt must be removed before such a differeing position can be obtained.

There are a number of advantages to the system when used with the rearward facing position shown in FIG. 9. In this system, the infant, in a forward impact situation is fully supported about the back of his head, shoulders and lower back against the cushion and double wall structure of the seat. Thus the full force of the impact is distributed across as large a portion of his body as is possible.

Further, the secondary reaction after the initial impact has been absorbed is for the child to pass backward toward the back rest of the automobile seat. This reaction is caused by the child's body being forced against the restraint harness which in turn pulls the shell around his body and into the automobile backrest which is the softest available part of the automobile. The forces that the child's body and shoulders are required to absorb at this point are considerably less than would be required at time of initial frontal impact of the automobile.

One of the primary advantages of the seat of the present system is that the molded shell itself fully surrounds and incorporates or "cocoons" the infant's body between the back rest and the shell. It is well known that in a dynamic crash, arms, legs, heads, purses, shattered glass and other material fly about the automobile. A child thus cocooned as described above is well protected against such secondary hazards.

It is to be understood that the above description and accompanying drawings are illustrative only. Accordingly, the invention is to be limited only by the scope of the following claims.

What is claimed is:
1. A car seat for use in an automobile having an adult restraining system, said seat comprising
   an integral substantially closed double-walled molded shell, said shell comprising
      a seat section,
      a back seat section; and
      side panel sections extending substantially the length of said seat section and said back section;
   a slot through said closed double wall in each side of said back rest section substantially adjacent said associated side panel section, and above said seat section, said slots being of a dimension to accept said adult restraining system; and
   restraint harness means secured to said shell for retaining the occupant within said shell.
2. The car seat of claim 1 further comprising
   a slot having a reduced entrant opening in the edge of each of said side panels above said seat section, said slots being of a dimension to receive and retain said restraining system.
3. The car seat of claim 1 further comprising
   an adjustable positioning bar secured between the outer lower seat back section; and
   means for selectively positioning said bar for upright and reclining support while said restraint harness means remains secured to said shell.
4. The car seat of claim 1 wherein said restraint harness means comprises
   a crotch strap secured to the front panel of said seat section and terminating in a buckle clasp;
   a plurality of shoulder belt slots in the upper portion of said back section and lap belt slots through said seat section;
   a one piece flexible belt passing through said shoulder and lap belt slots so as to form a continuous shoulder belt and lap belt; and
   means for securing said formed shoulder belts and lap belts to said buckle clasp.
5. The car seat of claim 4 wherein said crotch strap is of a predetermined length so as to hold the formed lap belts over the thighs of the occupant.
6. The car seat of claim 5 wherein said slots for said lap belt are so located in said seat section of said car seat so as to fixedly position said lap belt angularly over the occupant's thighs substantially forward of said occupant's hip joint.
7. The car seat of claim 4 wherein said slots through each side of said back section are located between said shoulder belt slots and said lap belt slots.
8. A car seat for use in an automobile having an adult restraining system comprising
   an integral closed double-walled molded shell, said shell comprising
      a seat section;
      a back rest section and side panel sections extending substantially the length of said seat section and said back section;
   a pair of slots through said back rest section above said seat section, said slots being of a dimension to accept said adult restraining system for securing said car seat within said automobile.
9. The car seat of claim 1 further comprising
   means secured to said shell for retaining the occupant within said shell.

* * * * *